United States Patent Office 3,491,043
Patented Jan. 20, 1970

3,491,043
CRAYON WAX COMPOSITION
Robert P. Zmitrovis, Freehold, N.J., assignor to Cities Service Oil Company, Tulsa, Okla., a corporation of Delaware
No Drawing. Filed Apr. 24, 1967, Ser. No. 632,915
Int. Cl. C09u 13/00
U.S. Cl. 260—23.5                    10 Claims

ABSTRACT OF THE DISCLOSURE

An improved crayon wax composition having a wax base, stearic acid, pigment, and various additives which synergistically impart improved breaking and marking qualities to the crayon wax. The wax base may comprise paraffin waxes (120 to 165° F. M.P.); microcrystalline waxes (140–210° F. melting point), vegetable, insect, or animal waxes, although paraffin wax is preferred. The additives comprise a mixture or system having synergistic qualities of Fischer-Tropsch wax and of either a terpene resin, an amorphous polypropylene or a phenolic resin, each in the amounts of between 0.25% and 2.5% of the composition by weight.

BACKGROUND OF THE INVENTION

Waxes are a commonly used material in the composition of various marking agents. A marking product which has continued in general use for a great number of years has been in the form of crayons completely made from the wax composition to form not only the marking medium but also the structural shape of the crayon. Such a dual purpose has imposed somewhat incompatible requirements on the composition. The composition must necessarily be both solid, possess structural rigidity and strength to form a satisfactory supporting structure, yet must also be soft enough to form a carrier for the pigment which will be deposited under pressure on the surface of the material to be marked. Of necessity the various compositions for crayon waxes used to the present time have been compromises between obtaining satisfactory strength and resistance to breaking, while simultaneously possessing sufficient softness and flow qualities under pressure to give satisfactory marking.

Presently a composition being used is composed of paraffin wax having a melting point usually between 145° F. and 150° F. which contains 1.5% to 2.5% microcrystalline wax. Additionally, stearic acid and the desired dye or pigment is added to make the complete crayon wax composition. Such a blend possesses sufficiently suitable qualities such as a resistance to breaking and adequate marking ability. However, due to the severe service to which certain crayons may be subjected, it is desirable to increase the resistance to breaking and at the same time enhance the marking ability. These are presently problems confronting the manufacture of improved crayon waxes.

SUMMARY OF THE INVENTION

This invention therefore relates to an improved crayon wax composition having a paraffin wax base, stearic acid, pigment, and small quantities of Fischer-Tropsch wax and either amorphous polypropylene, terpene resin or phenolic resins to synergistically impart improved breaking strength and marking qualities to the crayon wax.

It is therefore an object of this invention to provide a novel composition for an improved crayon wax having improved marking qualities and resistance to breaking.

Another object of this invention is to provide a crayon wax having improved marking characteristics.

Yet, another object of this invention is to provide a crayon wax composition having improved strength qualities.

Other objects of this invention will be obvious from the following description of the invention.

DESCRIPTION OF THE PREFERRED EMBODIMENT

The crayon wax composition of this invention has for its basic constituent a wax in the amount of from about 40% to about 99% by weight of the composition.

The base wax while preferably a paraffin wax having a melting point of from about 145° F. to 155° F., may also comprise microcrystalline waxes having melting points of from about 140° F. to about 210° F., vegetable, insect and animal waxes and mixtures thereof.

Ordinarily, commercial paraffin wax consists of straight chain or normal paraffin hydrocarbons of the $C_nH_{2n+2}$ series. These hydrocarbons have average molecular weights in the range of 360 to 492 with individual components varying from $C_{20}$ to $C_{35}$, although there are some higher melting waxes with molecular weights of up to 600. Generally, these paraffin waxes are characterized by having a melting point between 120° F. and 165° F., a viscosity between 35 and 60 SUS at 210° F., and a flash point between 350° F. and 450° F. (ASTM D-92). They are produced from the heavier fractions of petroleum distillates, by first dewaxing the distillate to obtain slack wax, and then deoiling the slack wax to obtain the paraffin wax.

Another constituent which is included in the crayon wax composition is stearic acid. The stearic acid is added generally in the amount of from about 10% to about 50% by weight, but more likely in the quantity of from about 25% to about 35% by weight.

To impart a color to the crayon wax composition as well as the desired color of the wax when applied as a marking, a pigment is added. This pigment is included in an amount to sufficiently impart the desired color density to the applied crayon wax composition and may be in the amount of from about 1% to aobut 25% by weight.

In order to obtain improved strength qualities, it has been found that the inclusion of a synthetic wax obtained by the Fischer-Tropsch process in small quantities from approximately 0.1% to 1½% by weight adds materially to the breaking strength of the crayon wax composition. It is preferred that the Fischer-Tropsch wax be included in the amount of from about ¼% to about ½% by weight in the composition. The Fischer-Tropsch process is described in pages 960 through 970 of vol. 6 of the Encyclopedia of Chemical Technology by Kirk and Othmer (1951, Interscience Pub.). Such Fischer-Tropsch waxes may be described as a synthetic wax produced from the Fischer-Tropsch process, which is generally a hard relatively high melting point, high molecular weight wax. The preferred Fischer-Tropsch wax constituent is Fischer-Tropsch Wax RG, commercially known as Paraflint-RG, and sold by Moore and Munger in this country. It is characterized by a melting point of 214° F., a molecular weight of approximately 750 and an oil content of 1%, a viscosity of 9.5 centipoises at 250° F. and a specific gravity at 77° F. of 0.945.

Another constituent of the crayon wax additive system according to this invention is either an amorphous polypropylene, a terpene resin such as a pinene or a phenolic resin or mixtures thereof. These are included in the crayon wax composition in small quantities sufficient to impart improved marking qualities to the wax, specifically in the amount of from 0.10 to 2.5% by weight of the composition. The preferred range of inclusion of the above additives for improving marking quality is in the range of from about 0.25% to about 1.5% by weight of the crayon wax composition.

An example of the amorphous polypropylene is Eastobond M-5 made by Eastman Chemical Products, Inc. and characterized by an average molecular weight of approximately 3,000 and a ring and ball softening point of 100° C. (ASTM D-36-26).

The terpene resins which may be included in the additive system of the crayon wax composition are alpha pinenes. Examples of such alpha pinene resins are Terpene Resin A 115 produced by Pennsylvania Industrial Chemicals and Terpene Resin 1125 produced by the Newport Division of Tenneco. They are characterized by a ring and ball softening point between approximately 115° C. and 125° C., a specific gravity of about 0.99, and a molecular weight of approximately 800 to 900.

The phenolic resins which may be included as a constituent of the additive system to the crayon wax composition are non-heat reactive (thermoplastic) substituted phenolic resins containing no labile formaldehydes. They are solids at room temperature having a melting point between 185° F. and 210° F., a specific gravity of approximately 1, and are hard friable materials. Phenolic resins having these characteristics are prepared by the reaction of a substituted phenol and formaldehyde employing acidic catalysts. One such resin is Phenolic Resin CRRB 0909 produced by Union Carbide.

The crayon wax composition of this invention may be manufactured in any of the several known methods including melting the base constituents separately and mixing them together or by melting a single base constituent and adding the several constituents consecutively or at the same time while maintaining the composition in a melted state and mixing it.

In order to more fully describe the composition of this invention, the following examples are given both by way of example and contrasting results. For purposes of comparison and evaluation the various compositions were subject to breaking and marking tests as hereinafter described.

A breaking strength of 3.0 lbs. minimum and a marking rating of "fair" was considered as commercially significant. The breaking force was determined on a 5/16 in. diameter wax cylinder, that being the actual size of a crayon. This cylinder was supported at two points 2½ inches apart and the force was applied to the middle at a constant rate. The force required to break the crayon was measured and the average of 24 tests was taken as the breaking strength.

Marking qualities were determined using a test apparatus that drives a crayon under load in a lateral motion while the marking surface is continuously advanced, and rerun three or four times. Qualities such as smoothness of laydown, regularity of coverage and tendency to pick up and form clumps of wax instead of giving an even distribution were noted and evaluated. The rating was done by an experienced operator and good correlation has been shown. Marking qualities were evaluated using about 30% stearic acid and either a 10% inclusion of brown pigment or a 1.5% inclusion of orange dye.

EXAMPLE 1

Various crayon wax compositions according to this invention were prepared using between 68.25% and 69.75% by weight paraffin wax having a 149° F. melting point (350 neutral wax), 30% stearic acid, and an additive system having 0.25% by weight Fischer-Tropsch Wax RG with the various following additives as listed with the accompanying results:

| Additive | Concentration, Percent wgt. | Breaking Force, Lbs., Orange Dye | Marking Quality, 78° F. | |
|---|---|---|---|---|
| | | | Orange | Brown |
| 1. Amorphous polypropylene | 0.25 | 3.32 | Good | Good. |
| | 0.50 | 3.47 | ...do...... | Do. |
| | 1.0 | 3.22 | ...do...... | Fair. |
| 2. Terpene resin (1125) | 0.5 | 3.00 | ...do...... | Do. |
| | 1.0 | 3.83 | ...do...... | Do. |
| | 1.5 | 3.90 | Fair | Good. |
| 3. Terpene resin (A-115) | 0.5 | 3.89 | Good | Fair. |
| | 1.0 | 3.31 | ...do...... | Do. |
| | 1.5 | 3.65 | ...do...... | Good. |
| 4. Phenolic resin (0909) | 0.5 | 3.54 | ...do...... | Do. |
| | 1.0 | 3.54 | ...do...... | Do. |
| 5. None | 1.5 | 3.64 | Fair | Fair. |
| | 0.0 | 3.23 | ...do...... | Do. |

EXAMPLE 2

Various compositions similar to those described in Example 1 except that all contained 0.5% by weight Fischer-Tropsch Wax RG were prepared and subjected to the aforementioned tests with the following results:

| Additive | Concentration, Percent wgt. | Breaking Force, Lbs., Orange Dye | Marking Quality, 78° F. | |
|---|---|---|---|---|
| | | | Orange | Brown |
| 1. Amorphous polypropylene | 0.25 | 3.35 | Fair | Fair. |
| | 0.50 | 3.56 | ...do...... | Do. |
| | 1.0 | 3.58 | ...do...... | Do. |
| 2. Terpene resin (1125) | 0.5 | 3.20 | ...do...... | Do. |
| | 1.0 | 3.42 | ...do...... | Good. |
| | 1.5 | 3.42 | ...do...... | Fair. |
| 3. Terpene Resin (A-115) | 0.5 | 3.19 | ...do...... | Do. |
| | 1.0 | 3.09 | Good | Do. |
| | 1.5 | 3.33 | ...do...... | Do. |
| 4. Phenolic resin (0909) | 0.5 | 2.91 | Fair | Do. |
| | 1.0 | 3.39 | ...do...... | Do. |
| 5. None | 1.5 | 3.29 | ...do...... | Do. |
| | 0.0 | 3.28 | ...do...... | Do. |

In contrast a crayon wax composition having the aforementioned paraffin wax (350 neutral wax, 149° F. M.P.), 30% stearic acid, and 2% microcrystalline wax (Microwax 220) with no Fischer-Tropsch Wax exhibited an unsatisfactory 2.03 lbs. breaking force and unsatisfactory marking qualities.

Results obtained with the various resins but without Fischer-Tropsch Wax were also unsatisfactory as shown below for a 0.25% addition of the resin having 30% stearic acid and 1.5% orange dye.

| Additive | Percent wgt. | Breaking Force, lbs. | Marking Quality |
|---|---|---|---|
| 1. Amorphous polypropylene (M-5) | 0.25 | Fractured | Fair. |
| 2. Terpene resin (A-115) | 0.25 | 0.79 | Poor. |
| 3. Phenolic resin (0909) | 0.25 | 0.53 | Fair. |

Finally, the inclusion of only Fischer-Tropsch Wax in the crayon wax composition without any of the other additives produced less than fully satisfactory results, as the brown marking qualities were poor, although breaking strength was satisfactory. This is shown by the following table for composition consisting of paraffin wax (350 neutral wax, 149° F. M.P.), 30% by weight stearic acid, 1.5% orange dye, or 10% brown dye, and the listed amount of Fischer-Tropsch Wax.

| | Breaking Force Orange Dye (lbs.) | Marking Quality | |
|---|---|---|---|
| | | Orange | Brown |
| Concentration, percent wgt.: | | | |
| 0.0 | 1.93 | Fair | Poor. |
| 0.10 | 3.05 | do | Do. |
| 0.25 | 3.20 | do | Do. |
| 0.50 | 3.48 | do | Do. |

Accordingly, with the intention of covering all changes and modifications as may be within the scope of this invention, and not intending to be limited to the forms disclosed herein, as these are to be regarded as illustrative rather than restrictive.

I claim:

1. In a crayon wax composition comprising a base wax, stearic acid, and a pigment, an additive system consisting essentially of:
   (a) Fischer-Tropsch Wax in the amount by weight of at least 0.1% of the composition; and
   (b) from about 0.1% to about 2.5% by weight of the composition of a resin selected from the group consisting of amorphous polypropylene and terpene resin.

2. The additive system of the composition of claim 1 wherein the Fischer-Tropsch Wax is in the amount of from about 0.1 to 1.5% by weight.

3. The crayon wax composition of claim 2 wherein the wax base is a paraffin wax and is in the amount of from about 50% to about 90% by weight of the composition, the stearic acid is in the amount of from about 25% to 35% by weight of the composition and the pigment is in the amount of from 1% to about 25% by weight of the composition.

4. The additive system of claim 3 wherein the resin is an amorphous polypropylene having an average molecular weight of about 3,000, in the amount of from about .25% to about 1% by weight of the composition.

5. The additive system of claim 3 wherein the resin is a terpene resin in the amount of from about 0.5% to about 1.5% by weight of the composition.

6. The composition of claim 5 wherein the terpene resin is a polymerized alpha pinene in the amount of from 0.5% to about 1.5% by weight of the composition.

7. The additive system of claim 1 wherein the Fischer-Tropsch wax is in the amount of from ¼% to about ½% by weight of the composition.

8. The additive system of claim 3 wherein the Fischer-Tropsch wax is characterized by a melting point of about 214° F., a molecular weight of approximately 750, an oil content of about 1%, a viscosity of 9.5 centipoises at 250° F. and a specific gravity of 0.945 at 77° F.

9. In a crayon wax composition comprising a base wax, stearic acid and a pigment, an additive system consisting essentially of:
   Fischer-Tropsch Wax in the amount of from 0.1% to 1.5% by weight of the composition, said Fischer-Tropsch Wax being characterized by a melting point of about 214° F., a molecular weight of approximately 750, an oil content of about 1%, a viscosity of 9.5 centipoises at 250° F. and a specifice gravity at 77° F. of 0.945; and
   an alpha pinene terpene resin in the amount of from 0.1% to about 2.5% by weight of the composition.

10. In a crayon wax composition comprising a base wax, stearic acid and a pigment, an additive system consisting essentially of:
    Fischer-Tropsch Wax in the amount of from 0.1% to 1.5% by weight of the composition, said Fischer-Tropsch Wax being characterized by a melting point of about 214° F., a molecular weight of approximately 750, an oil content of about 1%, a viscosity of 85 centipoises at 250° F. and a specific gravity at 77° F. of 0.945; and
    an amorphous polypropylene in the amount of from 0.1% to about 2.5% by weight of the composition.

References Cited

UNITED STATES PATENTS

| 394,937 | 12/1888 | Requa | 106—19 |
| 418,947 | 1/1890 | Hart | 106—19 |
| 2,319,389 | 7/1940 | Corkery et al. | 260—28 |

DONALD E. CZAJA, Primary Examiner

D. J. BARRACK, Assistant Examiner

U.S. Cl. X.R.

106—19; 260—23, 28.5